US006564997B1

(12) United States Patent
Juds

(10) Patent No.: US 6,564,997 B1
(45) Date of Patent: May 20, 2003

(54) ELECTRONIC SECURITY KEY FOR ENABLING ELECTRONIC COIN ACCEPTORS AND THE LIKE

(75) Inventor: Scott Juds, Seattle, WA (US)

(73) Assignee: IDX, Inc., El Dorado, AK (US)

(*) Notice: Subject to any disclaimer, the term of this patent is extended or adjusted under 35 U.S.C. 154(b) by 0 days.

(21) Appl. No.: 09/439,995

(22) Filed: Nov. 15, 1999

(51) Int. Cl.[7] .................................................. G06K 5/00
(52) U.S. Cl. ..................... 235/382; 235/382.5; 235/375
(58) Field of Search ................................ 235/382, 379, 235/382.5, 380, 375; 463/20, 21, 24, 29, 16

(56) References Cited

U.S. PATENT DOCUMENTS

| | | | | |
|---|---|---|---|---|
| 4,437,558 A | | 3/1984 | Nicholson et al. | |
| 4,469,213 A | | 9/1984 | Nicholson et al. | |
| 4,556,140 A | | 12/1985 | Okada | |
| 5,158,166 A | | 10/1992 | Barson | |
| 5,321,242 A | | 6/1994 | Heath, Jr. | |
| 5,330,041 A | | 7/1994 | Dobbins et al. | |
| 5,443,144 A | | 8/1995 | Dobbins et al. | |
| 5,477,952 A | | 12/1995 | Castellano et al. | |
| 5,879,234 A | * | 3/1999 | Mengual | 463/20 |
| 6,251,014 B1 | * | 6/2001 | Stockdale et al. | 463/16 |

FOREIGN PATENT DOCUMENTS

JP 407313712 A * 12/1995

* cited by examiner

*Primary Examiner*—Karl D. Frech
(74) *Attorney, Agent, or Firm*—Diller, Ramik & Wight

(57) ABSTRACT

An electronic security key is particularly adapted to exchange electronic data with an electronic coin acceptor circuit of a coin acceptor to enable the coin acceptor for coin programming. The electronic security key includes an electronic security key circuit defined by subcircuits including (1) circuitry for exchanging electronic data with an electronic coin acceptor, (2) encryption generating circuitry for generating encrypted password data at a sufficient value to generate authentication data from at least a portion of the electronic data transmitted to the electronic security key circuit, and (3) circuitry for transmitting the generated authentication data to an electronic coin acceptor circuit to thereby enable the electronic coin acceptor circuit for coin programming thereof.

31 Claims, 11 Drawing Sheets

ELECTRONIC SECURITY KEY FOR ENABLING ELECTRONIC COIN ACCEPTORS AND THE LIKE

FIELD OF THE INVENTION

The present invention relates to coin validation devices, more commonly known as coin acceptors, wherein the term "coin" is intended to mean metal currency, tokens, counterfeit coins or slugs of all kinds, and wherein a coin validation device (coin acceptor) is an electromechanical device used within a coin operated device (casino slot machine) to validate coins deposited by its patrons/users.

DESCRIPTION OF RELATED ART

Coin acceptors are used in gaming establishments with coin operated gaming devices, such as slot machines, video poker machines, and other similar devices. As many as three thousand (3,000) of such devices may exist in a single gaming establishment. The combination of a tremendous amount of money in the machines and relatively large gaming establishments with many, many people milling about has long been an attraction to persons desiring to "cheat the system" with any number of creative schemes. The response of manufacturers has been the continuous evolution of coin acceptor designs, including validation systems thereof, which started as a simple entry slot with a "wire coin switch," then evolved through stages which include mechanical sizers, magnetic rejectors, inductive metal evaluation sensors, coin string cutters, optical diameter measurement sensors, optical coin direction sensors and others.

Originally, a coin acceptor handled a single kind of coin and had no extra set-up procedure required for proper operation. With the advent of simple single coin electronic coin acceptors, as exemplified by U.S. Pat. Nos. 4,469,213 and 4,437,558 both issued to Nicholson and now commonplace, set-up required a sample coin to act as a reference comparison coin which is located in the acceptor between two sensing coils. More recently, coin acceptors have been designed to accept multiple types of coins, thus making the reference coin scheme impractical and thereby requiring a more complex procedure wherein the coin acceptor is "trained" on each of the coin types it is to accept, and the resultant numerical training data is stored in the memory of the coin acceptor circuit and is later used to judge the coins presented for validation.

Since originally only one coin could be accepted by a coin acceptor, there was no question as to which coin was to be accepted in the machine. With the advent of simple single coin electronic coin acceptors, it became possible for cheaters to find ways to alter the coin acceptance of a machine by altering the reference coin. In some instances, an inside employee has been known to open the machine and change the reference coin in a slot machine to one of a lower denomination for an outside friend while playing at the machine, then change the machine back to the higher valued reference coin. In other instances, the reference coin has been strategically dislodged by fishing or snaking a stiff wire down the coin slot to the reference coin, manipulating the wire and dislodging the coin sufficiently to allow lower denomination coins to be accepted. The first scheme is primarily averted by careful security procedures, including signing a register in the machine every time the machine is opened, and through wide use of security cameras. The second scheme is usually not detected until the pay-out hopper of a particular machine is emptied of the higher denomination coins, the less than honest player leaves and an honest player reports having been paid out in lower denomination coins. Either of these problems can go on for a considerable length of time absent notice because the reference coin is not visible (except when the machine is opened).

More recently, coin acceptors designed to accept multiple types of coins have presented an even more masked threat to the security problem. It is possible for an unscrupulous employee, such as a slot machine technician of either the gaming establishment or the equipment supplier, to train the coin acceptor to accept an extra coin type of his choice, and then communicate the location of this "altered" machine to an outside partner. In this case, there is no sample reference coin that is visible when the machine is opened to verify that nothing has changed. Furthermore, the perpetrator could wait many months before making use of the machine that he has set to accept the special coin, thus making it hard to identify the perpetrator.

Although much attention has been paid to providing secure means for (a) accessing coin hoppers and coin vaults in gaming machines through locks and signature logs, (b) changing the programming or hardware of the gaming machines via oversight of gaming inspectors, and (c) tracking the coin-in and coin-out counts, as in U.S. Pat. Nos. 5,321,242 and 5,477,952, there has been little attention paid to providing means for preventing the unscrupulous from configuring the modern electronic memory based coin validation device to accept lower denomination coins or slugs in addition to those desired by the gaming establishment. This security deficit is a non-trivial financial vulnerability to the gaming establishment.

Further to the issue of security associated with coin operated gaming devices is the possibility of attack through the use of slugs manufactured to imitate the desired coin for acceptance, or the possible use of coins or tokens from other gaming establishments which have similar characteristics to the desired coin. While there are some cases where the imitation is so close to the desired coin that it cannot be distinguished, in many cases the imitation is not such a perfect match and results in relatively low acceptance rates. While all coin acceptors are designed to maximize invalidating or rejecting any coins not sufficiently close to the valid acceptable coin, little else has been done to reduce the financial vulnerability of the gaming establishment to these kinds of attacks, except for tightening the acceptance parameter windows of coin acceptor validation circuitry when there is cause to believe that recent poor acceptance rates are related to attempts to pass invalid coins through the systems, such as disclosed in U.S. Pat. Nos. 5,330,041 and 5,443,144, each in the name of Dobbins et al.

Today's financial vulnerability of gaming establishments creates a need for improved security.

SUMMARY OF THE INVENTION

A primary object of the present invention is to provide solutions to obviate the security problems just described through security programming means for memory based coin acceptors including password generation, password authentication of the operator, authentication of an electronic security key; time, date and identification (ID) information logging into programmed coin acceptors, and logging coin acceptor serial numbers programmed by an operator to a secured computer data base.

Another object of the invention is to provide means for identifying and signalling the likely activity of a cheat trying to pass slugs through a coin acceptor, including visually indicating the detected activity within the gaming establishment to attract the attention of security guards, and to provide signals to which an automated security camera system may respond by aiming strategic cameras to record the possible fraudulent activity.

The invention preferably includes an electronic security key which is connected to a coin acceptor and enables the coin acceptor before the coin acceptor can be "trained" (programmed or reprogrammed) with respect to a new coin (or a set of coins). The electronic security key also functions as the medium by which operator identification (ID) data, time data and date data are conveyed to and stored in a memory of the coin acceptor and through which the coin acceptor identification (ID) data are conveyed back to and are stored in a memory of a computer data file. Such interaction between the electronic security key, the coin acceptor and the computer provides for full and redundant tracking of individuals who made changes (program) coin acceptors and which coin acceptors were changed, thus providing a means to both discourage fraudulent activity and to identify individuals who are responsible for current coin acceptor programs/configurations.

The current invention also includes a "tilt" illuminator for use in the conventional candle annunciator assembly on top of a slot machine. The "tilt" illuminator is driven by an electrical output from a coin acceptor to indicate to security personnel that it is likely experiencing fraudulent activity. The coin acceptor will at the same time self-inhibit for a preset period of time as a means of discouraging the majority of such fraudulent activity, including coin stringing and the use of slugs. Furthermore, electrical signals indicative of fraudulent activity are provided for the purpose of communicating with an automated security camera system in order to call attention of the activity to remote security personnel, as well as to capture the possible fraudulent activity on tape for later use by security and law enforcement personnel.

With the above and other objects in view that will hereinafter appear, the nature of the invention will be more clearly understood by reference to the following detailed description, the appended claims and the several views illustrated in the accompanying drawings.

DESCRIPTION OF THE PREFERRED EMBODIMENTS

Figure 1:
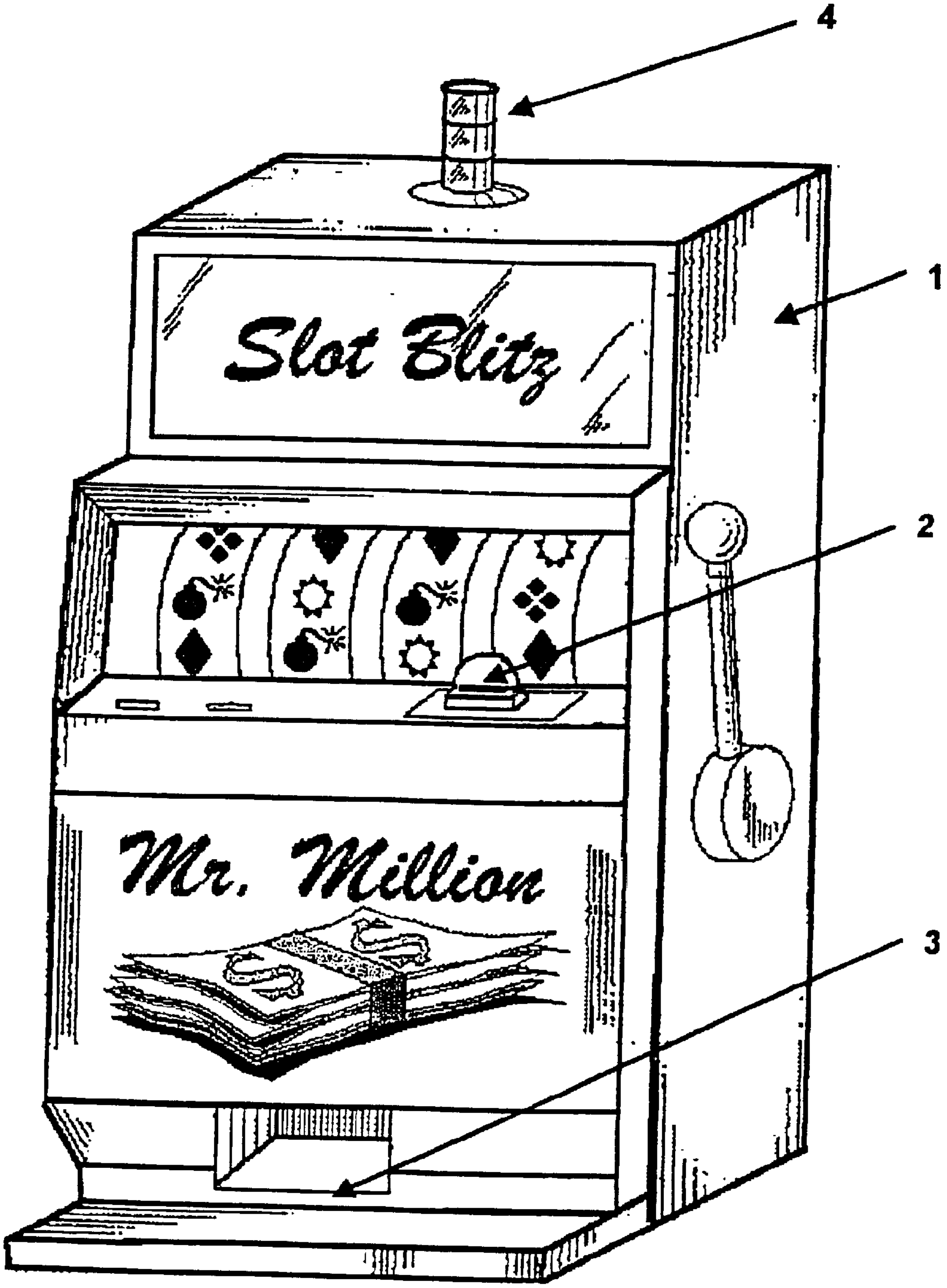
FIG. 1 is a schematic perspective view, and illustrates a typical slot machine including a coin entry head, a rejected coin exit, and a candle annunciator.

A conventional slot machine 1 is illustrated in FIG. 1 of the drawings and is of the so-called upright variety commonly used in gaming establishments/casinos. The slot machine 1 includes a coin head or coin slot 2 into which one or more coins are deposited by a player/customer/patron to place a bet on the next outcome of spinning wheels (unnumbered). Internal to the slot machine 1 and directly under a coin head 2, a deposited coin passes through a coin acceptor device 22 (FIG. 5) that checks the deposited coin for various characteristics. Once such coin acceptor device 22 is fully disclosed in commonly assigned application Ser. No. 09/041,297 in the names of Scott Juds et al. which was filed on Mar. 12, 1998 and was issued on Feb. 8, 2000 under U.S. Pat. No. 6,021,882. Other multi-coin electronic acceptors are exemplified in U.S. Pat. Nos. 4,556,140 and 5,158,166 issued to Okada and Barson, respectively. If the coin/token is valid, the coin is accepted and a customer is provided machine play credit. If the coin is invalid, it is rejected and returned to the customer through a coin return chute 3 into a tray (unnumbered) therebelow. Status indications for "change requested," "door open" and the like are indicated through illumination of various lights in a conventional candle annunciator 4.

The coin acceptor 22 is serviced through an opening in a hinged front face service door (not shown) of the slot machine 1 which accesses all of the internal electronic and mechanical components of the slot machine 1. Servicing of the coin acceptor 22 may be required for any of the following purposes: (a) alleviating a coin jam, (b) cleaning out debris or sticky residues from spilled drinks, (c) diagnosing wear and tear malfunctions, (d) repairing damage from vandals or (e) changing the type of coin to be accepted. Other reasons for opening the service door of the slot machine 1 include refilling the coin hopper when it has been emptied through a string of pay-outs, servicing other equipment failures, such as burned out light bulbs, and reading internal counters for accounting purposes.

As can be readily appreciated, there are numerous reasons for opening the service door of the slot machine 1. Each time the slot machine door is opened, there is an opportunity for a less than honest employee to attempt some sort of scheme to cheat the establishment by altering some characteristic of the slot machine, including and in particular, that of the coin acceptor 22. In spite of the use of reasonably effective security procedures by gaming establishments, there will likely be no end to the innovative schemes used by people to circumvent security procedures to cheat the slot machine and the gaming establishment.

In order to better secure the newest generation of coin acceptors 22 which store a coin profile in memory chips, rather than in a visible sample coin, an electronic security key 13 of the present invention is designed to significantly limit slot machine access and provides tracking of personnel making changes to the "accept" criteria of the coin acceptor.

Before describing the specifics of the electronic security key 13 of the present invention, the following features are desirably and necessarily afforded thereby:

1. The electronic security key is portable and is readily and easily connected to a coin acceptor.
2. The electronic security key is first enabled through a log-on procedure which records time and date data and the identification (ID) data of an authorized operator in the circuitry of the electronic security key.
3. When the electronic security key is plugged into the coin acceptor, an encrypted exchange of data verifies authenticity of the electronic security key and ascertains whether the electronic security key has been enabled by an authorized operator.
4. Time, date and identification (ID) data of the authorized operator is stored in the coin acceptor and the identification (ID) data of the coin acceptor is stored in the electronic security key.
5. Upon successful verification, the coin acceptor will allow changes in its coin acceptance parameters only so long as the electronic security key is connected to the coin acceptor.
6. Upon completion of all coin acceptor changes, the operator must disable the electronic security key in a process that also records a data file containing the time and date, as well as the identification (ID) data of the operator and the identification of all of the coin acceptors that were connected to the electronic security key during the time the electronic security key was enabled.

Figure 2:
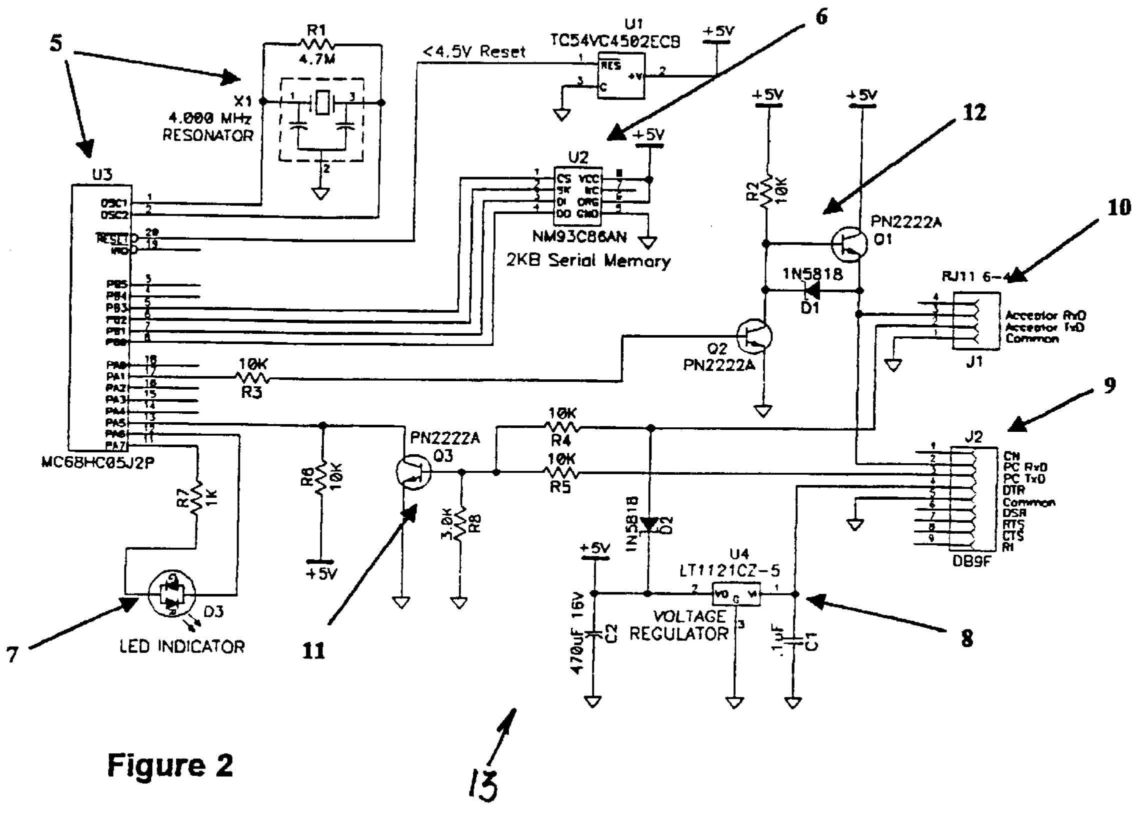
FIG. 2 is an electrical schematic, and illustrates components of an electronic security key for generating a coin acceptor enabling signal, which when transmitted to validation circuitry of the coin acceptor will permit coin programming thereof.

A representative schematic for an electronic security key/electronic security key circuit is illustrated in FIG. 2 of the drawings and includes a microcontroller, resonator and reset circuit 5 forming the basic core computing capability of the electronic security key circuit 13. A Motorola MC68HC05J2P microcontroller contains a variety of input and output pins which are programmable to function as needed. The program ROM and scratch pad RAM memories are built into the microcontroller chip. Time, date and identification (ID) data are stored in a National Semiconductor NM93C86AN non-volatile EEPROM serial memory chip 6. Indication of operating conditions of the electronic security key circuit 13 is provided through a bi-color indicator LED 7. Power for the electronic security key circuit 13 is provided through power supply components 8 which derive their source of energy from a serial port of a device to which the electronic security key 13 is connected. For example, the electronic security key 13 can be connected to a computer 15 and derives its power therefrom through a serial port 9 or can be connected to the coin acceptor 22 through serial port 10 deriving its power therefrom. The circuit components 11 form a RS-232 compatible serial data receiver buffer amplifier, and circuit components 12 form a RS-232 compatible serial data transmit buffer amplifier. It is understood that there are many alternative equivalent electronic components and circuits for achieving the same functions which one skilled in the art could implement from numerous components available in the market. It is also understood that while the specific implementation of the electronic security key circuit 13 of FIG. 2 includes a serial data port and a cable, one skilled in the art could realize the same functions using a parallel data port, instead of a serial data port, or using a wireless link versus a hardwired connected link.

Figure 5:
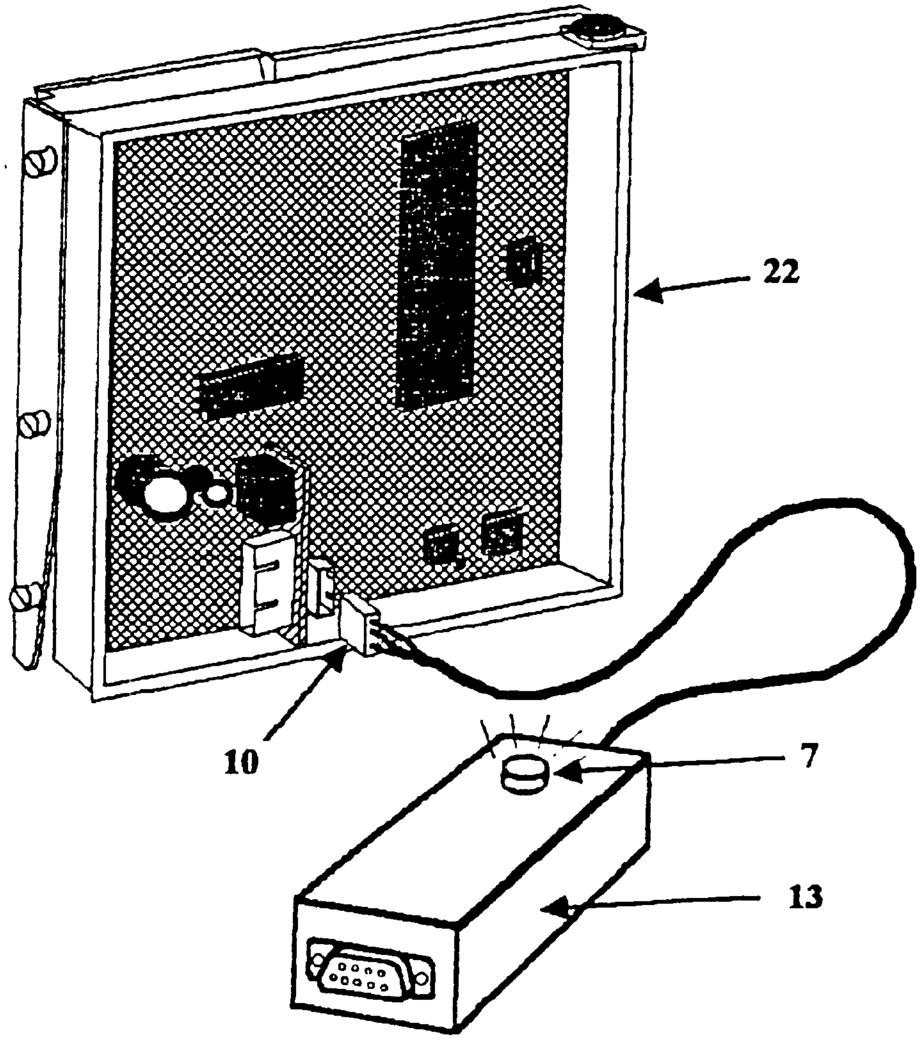
FIG. 5 is a perspective view, and illustrates the electronic security key being connected to a coin acceptor/validation device of a slot machine.

Though the latter broad description of the electronic security key circuit 13 is sufficient for a complete understanding of the invention, the following more specific details thereof will enhance a thorough understanding of the invention. As described earlier, the microcontroller, resonator and reset circuit 5 form the basic core computing capability of the electronic security key. The resonator is connected to pins 1 and 2 of the microcontroller to regulate its clock circuit. The reset circuit is connected to pin 20 of the microcontroller to control the smooth start up of the microcontroller when power first is applied to the circuit. The program ROM and scratch pad RAM memories are incorporated into the microcontroller chip for storage of data computed during operation. In addition, the nonvolatile EEPROM serial memory chip 6 (National Semiconductor NM93C86AN) is utilized to store time, date and ID data. The memory chip 6 is connected to input/output pins 5–8 of the microcontroller. The bi-color indicator LED 7 is provided to indicate operating conditions of the electronic security key, which is described in more detail below. Power for the circuit is provided through the power supply components 8 including the voltage regulator which derive their source of energy from pin 4 of serial port connector 9 when connected to a personal computer. Pin 4 of the standard 9 pin serial port connector is the DTR (data terminal ready) pin, which is set high by the application software and is capable of providing the necessary power to operate security key circuit 13. In addition, in this embodiment, the electronic security key circuit 13 also includes a serial port 10 which is adapted for connection to coin acceptor 22, as shown in FIG. 5, wherein power to operate security key circuit 13 is derived from the electrical signal characteristics of the data transmitted from coin acceptor 22 on pin 2 of connecter 10, as will be more fully described later. Preferably, the electronic security key circuit of the present embodiment also includes circuit components 11 and 12. Circuit components 11 are shown connected with serial ports 9 and 10 at pins 3 and 2, respectively, and connected to pin 13 of the microcontroller. Circuit components 12 are shown connected to both serial ports 19 and 10 at pins 2 and 3, respectively, and to pin 17 of the microcontroller. Circuit components 11 form an RS-232 compatible serial data receiver buffer amplifier and circuit components 12 form an RS-232 compatible serial data receiver buffer amplifier for regulating the exchange of data.

Figure 3:
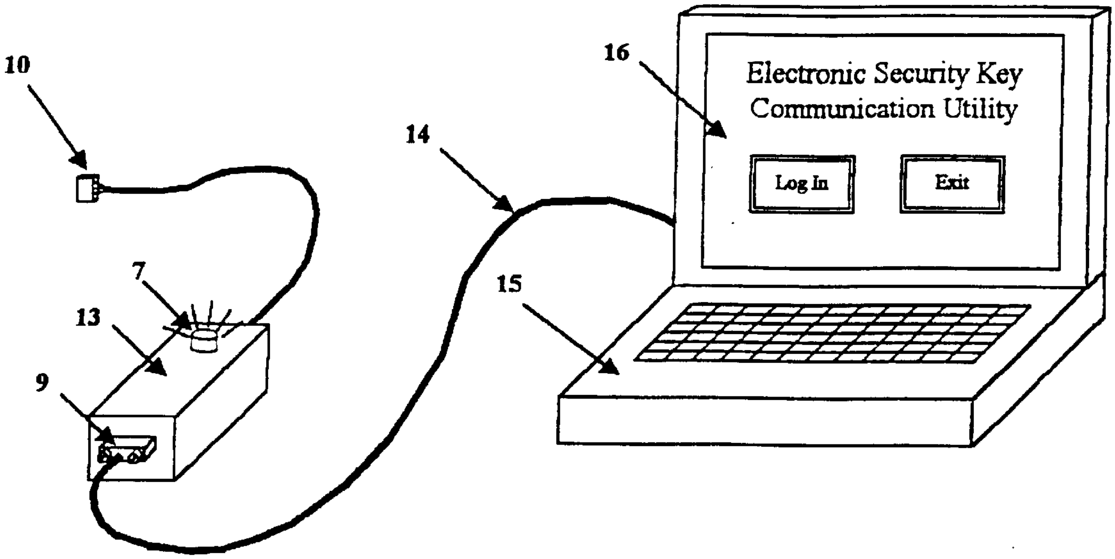
FIG. 3 is a perspective view, and illustrates the electronic security key of the invention connected to a personal computer.

Reference is now made to FIG. 3 of the drawings which discloses as a first step of the enablement process. A cable 14 connected by a connector 19 to the electronic security key/electronic security key circuit 13 and to a serial data port of a conventional personal computer 15. This connection provides power from the computer 15 to the electronic security key circuit 13 and allows an authorized operator to log-on and enable the electronic security key 13. The computer 15 is used in conjunction with specific application software forming no part of the invention except as it provides necessary functions and screens 16 associated therewith so that the operator can have his authorization confirmed and can record the current time and date in the electronic security key circuit 13, as well as record personal identification (ID) data/information of the authorized operator to electronically enable the electronic security key circuit 13 and to initiate a data file in the computer 15 with respect to a specific transaction. LED 7 could, for example, function to be in the "OFF" state when there is no power supplied from the computer 15, emit green light when power is applied and the electronic security key 13 has successfully established an authorized data link with a coin acceptor 22, blink red when power is applied but no authorized or compatible data link is established, and other combinations of red, green or amber (amber being a combination of red and green) either in a steady or blinking mode for other diagnostic indications.

Figure 4:
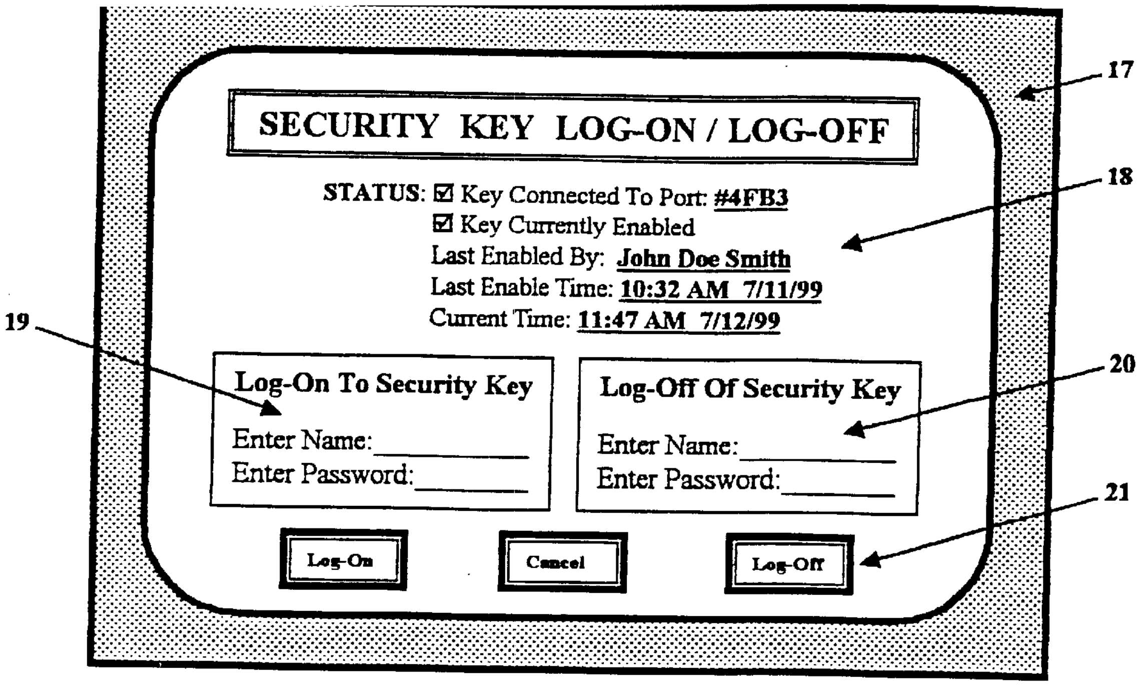
FIG. 4 is an elevational view, and illustrates a computer screen of the personal computer with information thereon for effecting logging on and logging off functions.

An example of the computer screen 17 of FIG. 4 shows the current status 18 of an electronic security key 13 currently connected to the computer serial data port. A facility 19 appears on the screen 18 to enter a name and a password in order to log-on to the electronic security key 13, and a facility 20 is provided to log-off of a currently enabled electronic security key 13. In the log-on process, a name and password are checked against an encrypted file of authorized personnel for verification. Only if the name and password are found in the authorized personnel file will any action be taken with the electronic security key 13. For a new log-on, an encrypted file is started which will contain the ID of the authorized person with a time and date stamped and the ID of the electronic security key that was connected at the time. When all activity with the electronic security key 13 has been completed and the authorized person desires to terminate responsibility for the electronic security key, then the log-off procedure is used. When invoked by a mouse-clicking log-off button 21, The log-off time stamp is recorded in aforementioned encrypted file. In addition, the computer 15 will read from the electronic security key 13 and write to the encrypted file the identification (ID) number of all coin acceptors that had been connected to the electronic security key 13 while enabled by this authorized person. The electronic security key 13 will then become disabled through commands sent from the computer 15.

Only after the electronic security key 13 has been enabled as described will it then function to enable respective compatible coin acceptors. In other words, the electronic security key 13 must be validated properly to be enabled before it in turn will enable a particular coin acceptor 22 to permit coin programming thereof by the person thus determined to be authorized.

FIG. 5 illustrates the connection of the electronic security key 13 to the coin acceptor 22 via a cable and connector 10. When connected and powered up, the electronic security key/electronic security key circuit 13 will attempt to establish communication with the coin acceptor 22, including the exchange of encrypted data to establish link verification and authorization. During this process, the time and date data and the identification data of the authorized person will be communicated from the electronic security key 13 to the coin acceptor 22 for nonvolatile storage for possible future tracking and programming history of the coin acceptor 22. Likewise, during the initial connection process, the identification (ID) of the coin acceptor 22 is communicated to and stored in the electronic security key 13 for eventual logging to the respective encrypted computer file. When connected, LED 7 indicates the status of the connection, including one state indicating verification that the coin acceptor 22 is now enabled to be programmed to accept some other coin type. Likewise, an indicator LED on the coin acceptor (not shown) may show the distinction between a coin acceptor with an enabled coin programming mode versus a coin acceptor with a disabled coin programming mode. The specific method used for programming the new coin type is immaterial within the context of the present invention, as the invention relates only to a secure method of enabling or disenabling the coin programming function of the coin acceptor 22.

Figure 7:
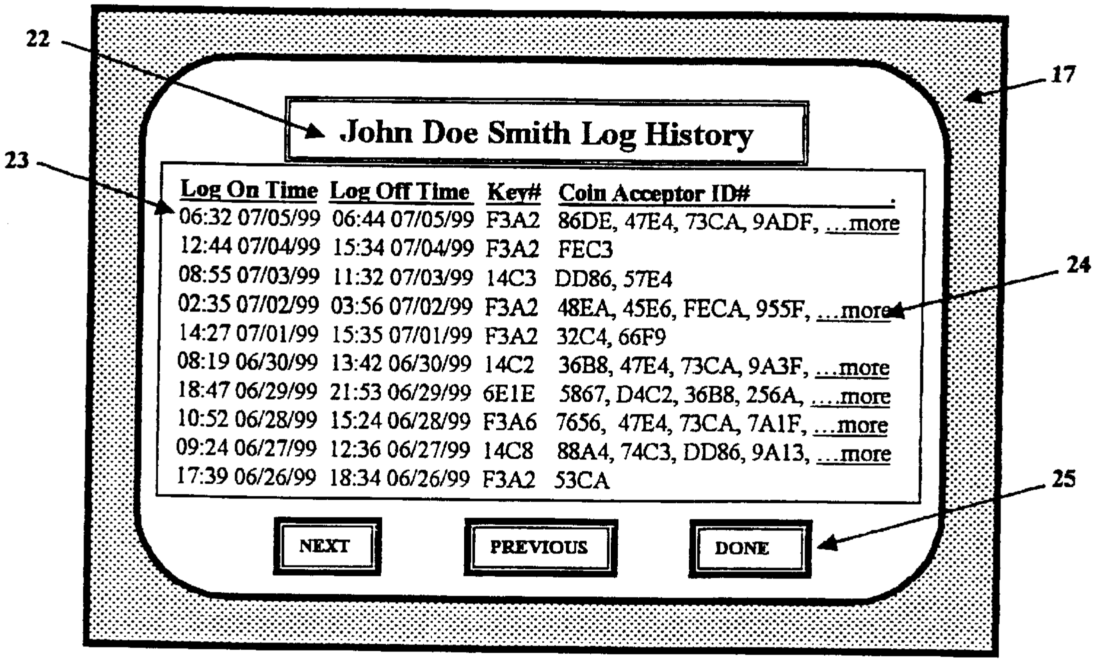
FIG. 7 is another elevational view of the computer screen, and illustrates an exemplary log history of a user/employee of the electronic security key.

In order to later examine the history of past transactions, computer screens can display the history for a particular employee 21 in the manner shown in FIG. 7, which includes records 23 of all log-on and log-off occurrences, the identification (ID) of the electronic security key 13 used by the employee, and the identification of each of the coin acceptors 22 with which the electronic security key 13 communicated while enabled. Controls 24 and 25 display additional details that normally will not fit on a single summary screen and can be provided as need be and is well known in the art, along with other conventional organizations of screen data, such as by date, by key ID or by acceptor ID.

Although the electronic security key/electronic security key circuit 13 thus described has the complete ability to track and record time data, date data, user ID data, coin acceptor ID data, and the like has obvious advantages, a simple electronic security key which only requires an electrical connection presence and electronic authentication as a prerequisite to enable and change the coin programming in memory based coin acceptors is a relatively straightforward alternative embodiment of the present invention.

In the simple embodiment of the electronic security key 13, the circuit is essentially the same in form and function as that heretofore described and illustrated in FIG. 2, less the provision for connection to the computer serial port through the connector 19 and less the voltage regulation provided for operation with a computer via voltage regulator circuit 8. Although there are many satisfactory ways known in the art in which power could be provided to the electronic security key circuit 13, power in keeping with the alternative embodiment of the invention is provided to the electronic security key circuit 13 by the coin acceptor circuit (not shown) of the coin acceptor 22, rather than by a battery or a plug-in power source. More specifically, since compatible coin acceptors utilize a serial data transmission signal that varies between +5V and circuit common, the electronic security key circuit 13 can utilize the intermittent +5V pulses from the coin acceptor data transmission signal to charge the +5V power supply capacitor of the electronic security key circuit 13 through the diode in the voltage regulator circuit 8 thus providing power for the electronic security key circuit 13 to operate.

Figure 6:
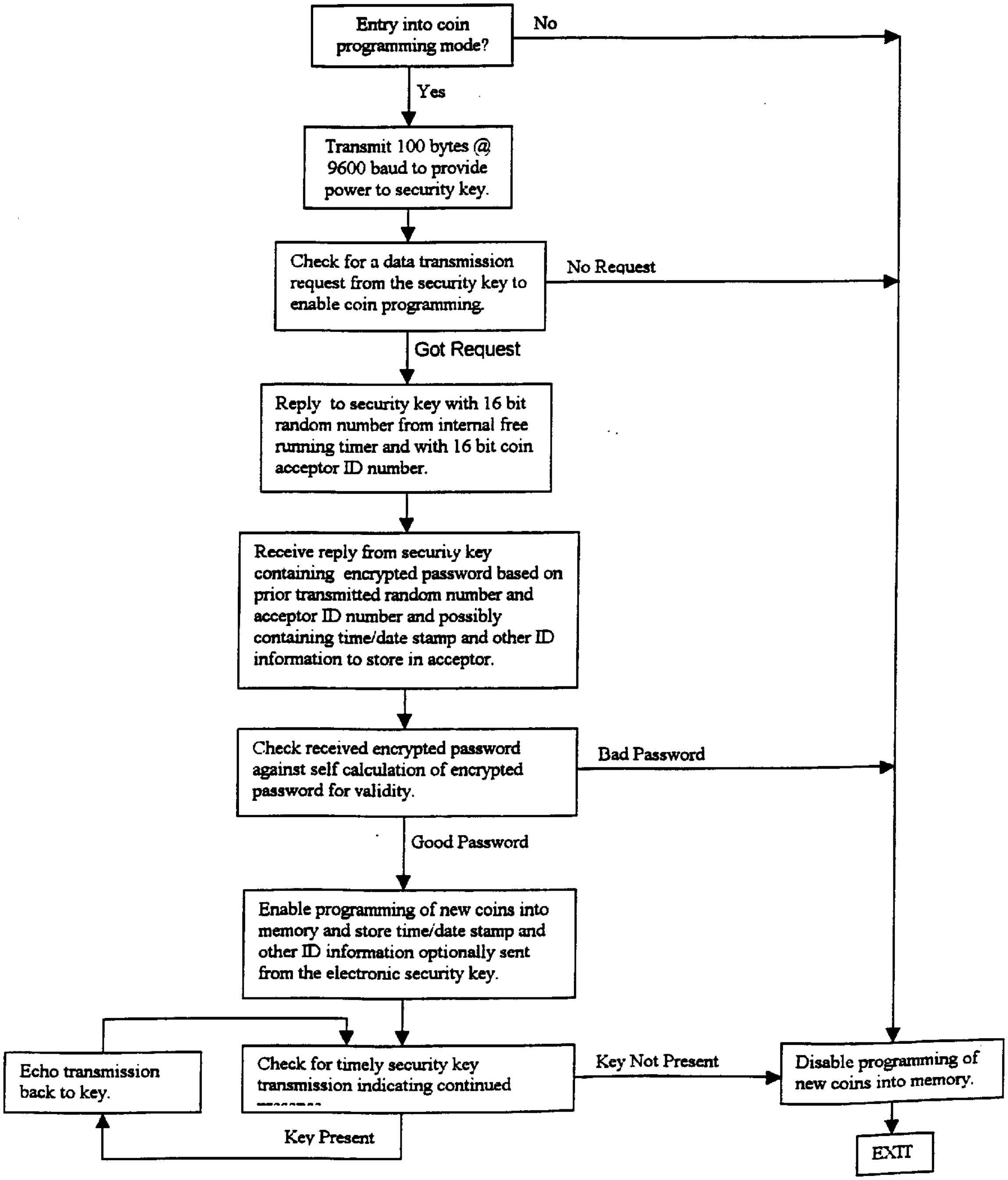
FIG. 6 is algorithm flow chart, and illustrates communication between the electronic security key and the coin acceptor for effecting enabling of the coin acceptor and programming thereof.

As is indicated in the flow chart of FIG. 6, when the electronic security key circuit 13 is connected to the coin acceptor circuit and the coin acceptor circuit is put into its programming mode (typically by rotating or pushing a switch on the coin acceptor), the coin acceptor circuit 10 will test for the presence of the electronic security key/electronic security key circuit 13. In order to determine if a valid electronic security key/circuit 13 is present, the coin acceptor circuit must first provide power to the electronic security key/circuit 13. To do this, the coin acceptor circuit transmits a string of bytes, as is conventional, long enough in duration for the +5V peaks in the transmission signal to charge-up the power supply capacitor of the circuit 9. For example, if the coin acceptor is able to source at least 50 mA of current and the string of bytes will be at +5V seventy-five percent (75%) of the time, then it can be calculated that 470 μF capacitor of circuit 8 can be charged to an operating voltage level in time:

$$t = \frac{(470\ \mu\text{F})(5\ \text{V})}{(50\ \text{mA})(75\%)} = 63\ \text{ms}$$

Although transmitting 60 bytes of the "space character" at 9600 baud would minimally fill this requirement, transmitting 100 bytes would more reliably provide the necessary charge in view of component variations from unit to unit in production.

When the power supply capacitor of the electronic security key circuit 13 is charged up, the microcontroller is reset by reset circuit 5 and initiates its program and transmits a message comprising one or more bytes to the coin acceptor circuit to request both the identification number (ID) data of the coin acceptor and random number data generated by the coin acceptor circuit which are then used by the electronic security key circuit 13 to feed an encryption algorithm to generate password data which is returned to the coin acceptor circuit as a means to confirm the presence of a valid electronic security key. The random number generator can be any of many known means, including simply using the current value of the 16 bit internal timer register which sequences through all of the 65,536 possible values 76 times a second. The encryption algorithm can be relatively simple and straightforward, but should at least be some mathematical and/or logical manipulation of the values fed to it which could not possibly be calculated by a human at a keyboard in real time or easily deduced from examination of a few example data sets. Although there are endless possible encryption algorithms, some as simple as logically rotating the bits a few positions on one of the numbers, doing an exclusive OR with the second number and subtracting a secret fixed value third number would be both quick and reasonably cryptic for the security level required in gaming establishment applications.

The electronic security key circuit 13 then replies to the coin acceptor. circuit with the encrypted password data. In addition to the encrypted password data, the electronic security key circuit 13 may also transmit information data, such as time/date data, security key identification (ID) data, user identification (ID) data for storage in the coin acceptor circuit for later possible use in the case of a security breach, etc.

When the coin acceptor receives the encrypted password reply, the coin acceptor circuit compares the received password data against the same calculation earlier made, and if they match, only then does the coin acceptor circuit enable itself for coin programming for a limited period of time. The limited period of time nominally is no more than a few seconds so that when the electronic security key circuit 13 becomes disconnected, the coin acceptor circuit disables its coin programming capability. While the electronic security key circuit 13 is still connected to a coin acceptor, it will engage in a continuous transmission of a unique message indicating that it is indeed still connected. The coin acceptor circuit in turn responds with an acknowledgement message that additionally serves to provide power to the electronic security key circuit 13 as described earlier.

Figure 8:
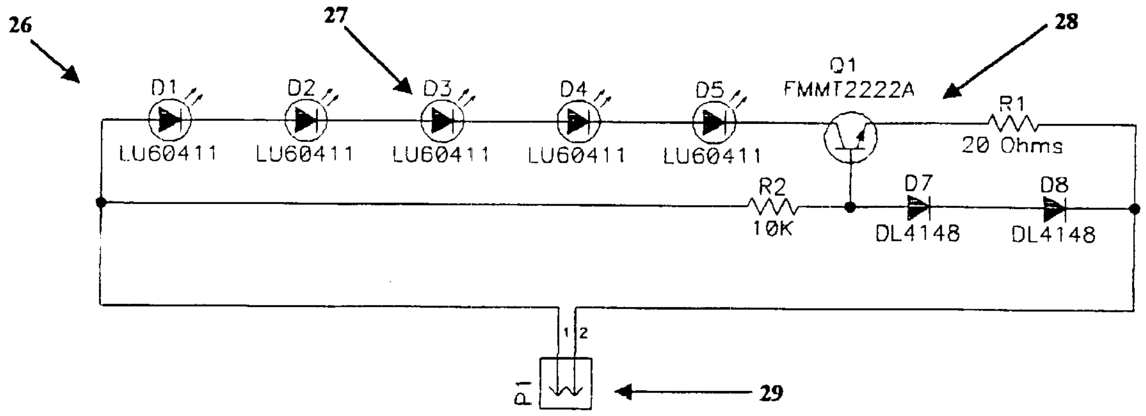
FIG. 8 is a an electrical schematic, and illustrates "tilt" illuminator circuitry for a candle annunciator.
Figure 9:
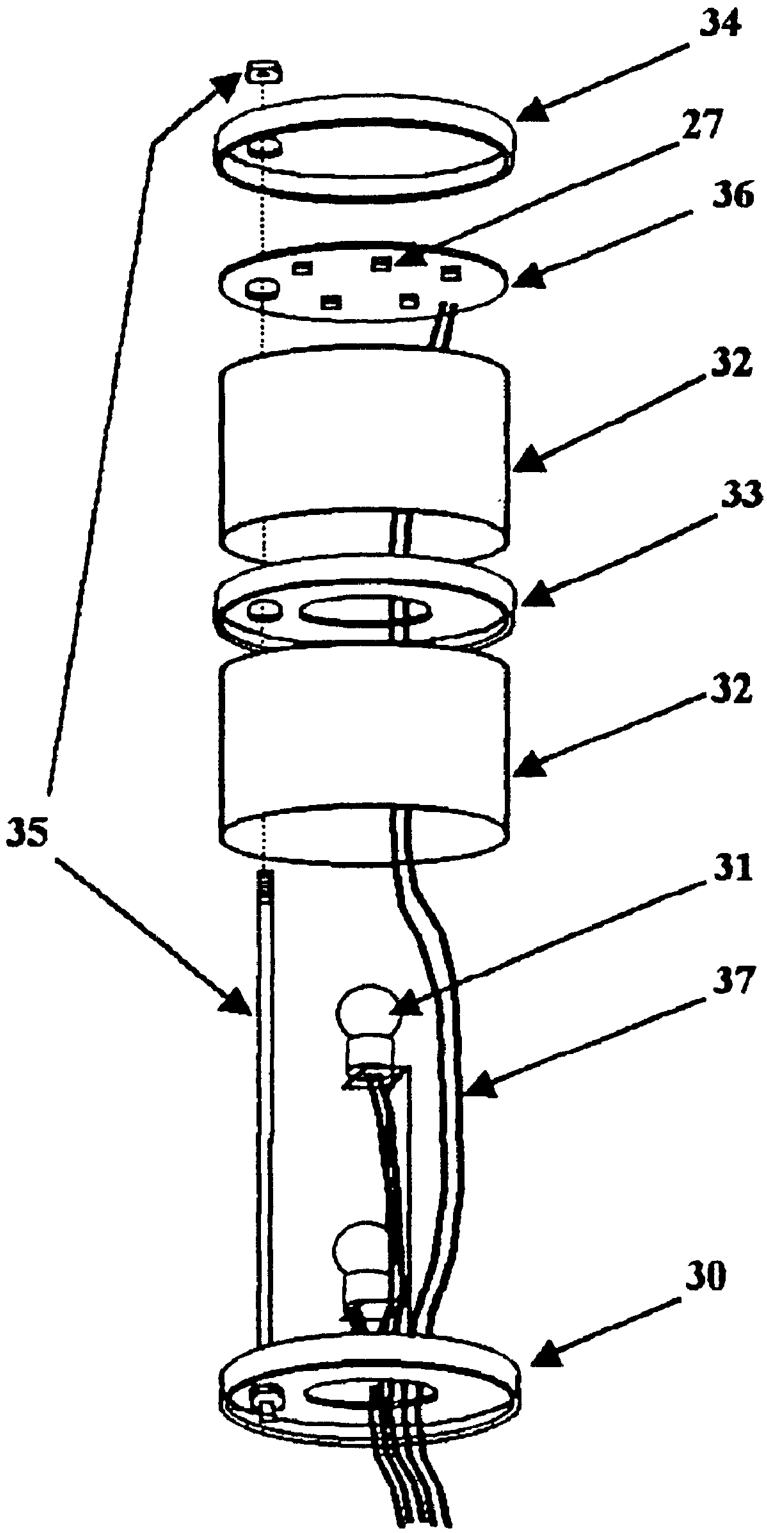
FIG. 9 is an exploded perspective view, and illustrates a "tilt" illuminator and candle annunciator assembly.
Figure 10:
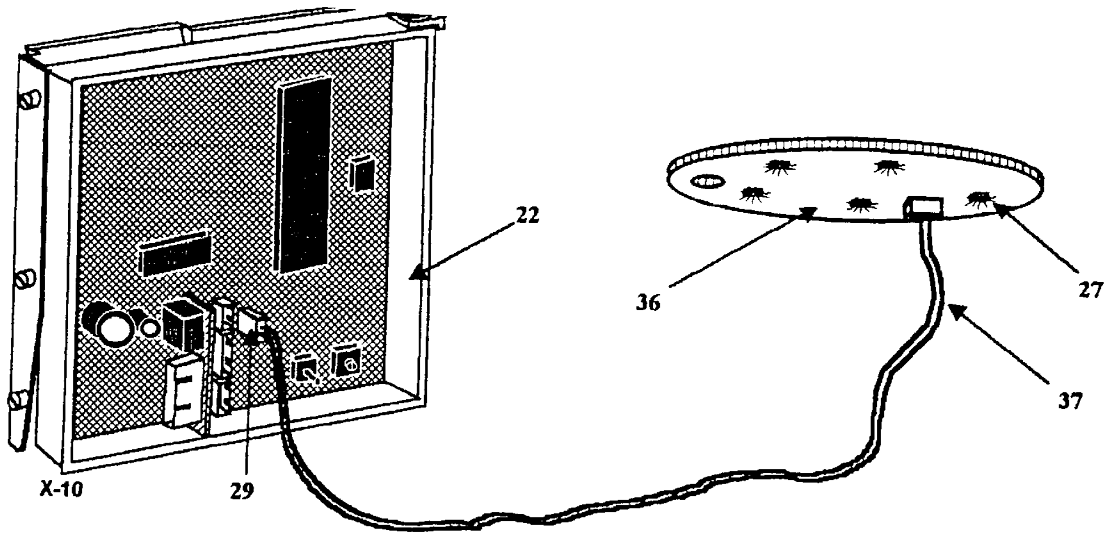
FIG. 10 is a perspective view, and illustrates the connection between a coin acceptor and the "tilt" illuminator of FIGS. 7 and 8.

In accordance with another aspect of the present invention and to additionally better secure coin acceptors from attack by less than honest customers who would try slugging or coin stringing techniques, a "tilt" illuminator 26 is provided in the manner best illustrated in FIG. 8 of the drawings which may be utilized to alert security personnel. The "tilt" illuminator circuit 26 is constructed as part of a circular circuit board 36 (FIGS. 9 and 10) so that it may be positioned in a top of a candle annunciator 35, as shown in FIG. 9. The "tilt" illuminator circuit 26 includes five (5) ultra-bright LEDs 27 connected in series with a regulated current source circuit 28 which limits the available current to the LEDs 27 to their specific maximum of 30 mA. The "tilt" illuminator circuit 26 is powered through a connection to the coin acceptor circuit of the coin acceptor 22, as shown in FIG. 10, wherein it is driven by a +12V power source connected to pin 1 of connector 29 and by an open collector NPN transistor driver, such as a PN2222. The NPN transistor driver is controlled by the coin acceptor circuit to turn on only when sensed conditions are abnormal and indicative of fraudulent behavior. For example, a coin that takes excess time to pass through the coin acceptor or a coin that appears to reverse direction through the coin acceptor can fairly confidently be assumed to be controlled by means other than gravity, such as by a string. If an abnormally high percentage of coins are rejected by the coin acceptor, it may be reasonable to assume that a less than honest customer may be trying to pass some fraudulent slugs through the machine which only marginally replicate the characteristics of the desired coin. Even in the case that these are not the correct reasons for the sensed events, it would not hurt to call attention to a coin acceptor that has malfunctioned and should be serviced so that customers may have a more positive experience with the equipment of the gaming establishment.

The "tilt" illuminator circuit board 36 is assembled into the top of the candle annunciator 35 by first unscrewing nuts from posts (unnumbered) which hold the assembly together. The "tilt" illuminator circuit board 36 is then placed on top of an upper translucent cylinder 32 with the LEDs 27 facing downward into the upper translucent cylinder 32 and with wires 37 passing downward through the entire structure into the body of the slot machine and to the coin acceptor 22, for example, where the cable is plugged in. Lights 31 normally illuminate the translucent cylinder 32 to indicate the need for various service functions, such as "change request" or "door open." Similarly, the "tilt" illuminator circuit 26 illuminates the upper translucent cylinder 32 with a unique pulsing red light following the detection of the prior described abnormal circumstances through the LEDs 27 with the intent of calling the attention of roving security personnel to these circumstances.

The "tilt" illuminator 26 effectively achieves three specific advantages with respect to fraudulent behavior, namely:

(a) eliminates as much fraudulent behavior as is possible which directly discourages the continuance thereof;

(b) makes problem behavior known to security personnel as soon as possible; and (c) avoids situations in which a slot machine may inadvertently be taken out of play until direct service attention can be arranged.

In order to accommodate the latter, in addition to calling attention to the problem as already described, the coin acceptor 22 must only indicate that there is a problem for a predetermined period of time and then return to normal operation. To further enhance the coin acceptor's defenses, while the "tilt" illuminator 26 is flashing, the coin acceptor 22 will also self-inhibit acceptance of other coins. This feature helps reduce the chance of multiple incidence of false credit from stringing and helps reduce the chance that a set of marginally manufactured slugs will have more than a few accepted once it has been sensed that the acceptance rate for the recently deposited coins is low.

Figure 11:
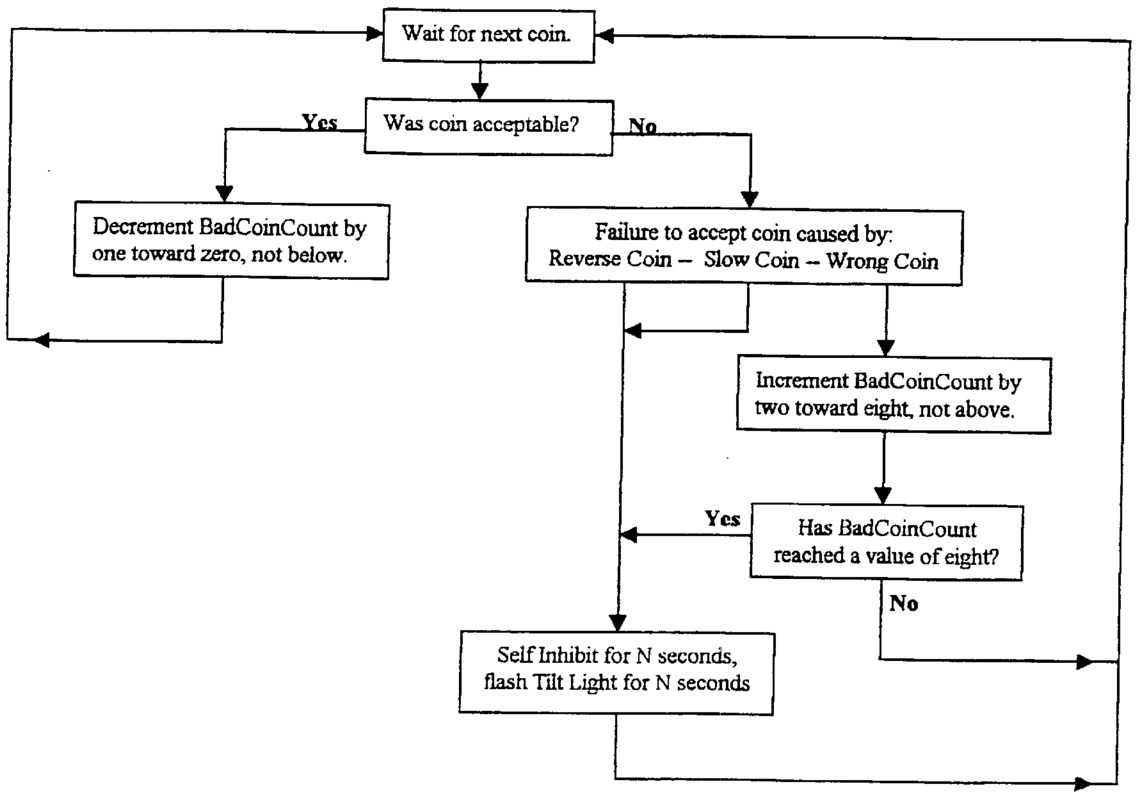
FIG. 11 is an algorithm flow chart, and illustrates steps for activating the "tilt" illuminator and self-inhibit thereof.

A simple up/down counter can be implemented to quickly determine if the acceptance rate is poor and trigger a "tilt" condition. For example, if the coin acceptor counts up by two toward eight for every coin rejected and down by one towards zero, then it can be shown that the "tilt" condition will be triggered for the case of four bad coins in a row, or for intermingled good and bad coins, if the acceptance rate is not at least 66.6%, a "tilt" condition will eventually be triggered. This up/down counter strategy, the time limited "tilt" indication, and the time limit itself inhibit are set forth in the flow chart of FIG. 11.

With the advent of networked tracking systems, as part of the large array of slot machines typically installed in a gaming establishment, it is possible to interconnect an electrical signal from a coin acceptor to the tracking system, such as the above described "tilt" illuminator signal or one or more bytes sent via a serial communication port, whereby the information may then be conveyed over the network to any other portion of the networked system which can automatically control the orientation of any of the many security cameras in the gaming establishment. In this way not only will security personnel be immediately notified, but the camera recording system has a chance of catching the actions and the identity of the less than honest customer.

Variations of the up/down counteralgorithm, choice of the time limit and format of the reporting electrical signal are all, of course, alternative implementations of the invention, as would be obvious to one skilled in the art once the details disclosed herein are known.

Although a preferred embodiment of the invention has been specifically illustrated and described herein, it is to be understood that minor variations may be made in the apparatus without departing from the spirit and scope of the invention, as defined the appended claims.

What is claimed is:

1. An electronic security key particularly adapted to exchange electronic data with an electronic coin acceptor to enable the coin acceptor for coin programming comprising an electronic security key circuit, said electronic security key circuit including means for exchanging electronic data with an electronic coin acceptor; encryption means for producing encrypted password data from at least a portion of the electronic data transmitted to the electronic security key circuit; and means for transmitting the generated encrypted password data to thereby effect an enabled state of the electronic coin acceptor for coin programming thereof.

2. The electronic security key as defined in claim 1 wherein the portion of electronic data is based upon a substantially random number.

3. The electronic security key as defined in claim 1 wherein another portion of the electronic data includes at least one of (a) identification number data representative of a specific electronic security key, (b) identification number data representative of a specific electronic coin acceptor, (c) identification number data representative of a specific person, (d) identification number data representative of an authorization date and time; said electronic security key circuit includes means for exchanging electronic data with software utility of a personal computer for validating the identification number data representative of a specific person and transmitting said data to said electronic security key circuit, said electronic security key circuit including means for storing multiple identification number data representative of persons recently connected to the electronic security key circuit, and said electronic security key circuit including circuit means for transmitting identification numbered data of persons connected to the coin acceptor back to the personal computer and stored thereat.

4. The electronic security key as defined in claim 1 wherein another portion of the electronic data includes at least one of (a) identification number data representative of a specific electronic security key, (b) identification number data representative of a specific electronic coin acceptor, (c) identification number data representative of a specific person, and (d) identification number data representative of an authorization date and time.

5. The electronic security key as defined in claim 1 wherein another portion of the electronic data includes identification number data representative of a specific electronic coin acceptor and memory means for storing identification number data representative of a multiplicity of electronic coin acceptors, including the specific electronic coin acceptor, to permit subsequent identification of all electronic coin acceptors to which the electronic security key was connected.

6. The electronic security key as defined in claim 1 wherein another portion of the electronic data includes at least one of (a) identification number data representative of a specific electronic security key, (b) identification number data representative of a specific electronic coin acceptor, (c) identification number data representative of a specific person, (d) identification number data representative of an authorization date and time; said electronic security key circuit includes a first functional state and a second functional state, said first functional state enabling production of the encrypted password data when said identification number data representative of a specific person is valid, and said second functional state disabling production of the encrypted password when said identification number data representative of a specific person is invalid.

7. The electronic security key as defined in claim 1 wherein the portion of electronic data is based upon a substantially random number transmitted from an electronic coin acceptor to said security key circuit via said electronic data exchanging means.

8. The electronic security key as defined in claim 7 wherein another portion of the electronic data includes at least one of (a) identification number data representative of a specific electronic security key, (b) identification number data representative of a specific electronic coin acceptor, (c) identification number data representative of a specific person, and (d) identification number data representative of an authorization date and time.

9. The electronic security key as defined in claim 7 wherein another portion of the electronic data includes at least one of (a) identification number data representative of a specific electronic security key, (b) identification number data representative of a specific electronic coin acceptor, (c) identification number data representative of a specific person, (d) identification number data representative of an authorization date and time; said electronic security key circuit includes a first functional state and a second functional state, said first functional state enabling production of the encrypted password data when said identification number data representative of a specific person is valid, and said second functional state disabling production of the encrypted password when said identification number data representative of a specific person is invalid.

10. The electronic security key as defined in claim 7 wherein another portion of the electronic data includes at least one of (a) identification number data representative of a specific electronic security key, (b) identification number data representative of a specific electronic coin acceptor, (c) identification number data representative of a specific person, (d) identification number data representative of an authorization date and time; said electronic security key circuit includes means for exchanging electronic data with software utility of a personal computer for validating the identification number data representative of a specific person and transmitting said data to said electronic security key circuit, said electronic security key circuit including means for storing multiple identification number data representative of persons recently connected to the electronic security key circuit, and said electronic security key circuit including circuit means for transmitting identification numbered data of persons connected to the coin acceptor back to the personal computer and stored thereat.

11. An electronic security key particularly adapted to exchange electronic data with an electronic coin acceptor to enable the coin acceptor for coin programming comprising an electronic security key circuit having data port means for exchanging electronic data with a coin acceptor circuit, said electronic security key circuit including analysis circuit means for analyzing random number data received via the data port means from the acceptor circuit, and means for transmitting a modification of at least a portion of the random number data back to the coin acceptor circuit for enabling the coin acceptor dependent upon the correctness of the modified data portion.

12. The electronic security key as defined in claim 11 wherein the electronic security key circuit includes means for performing a mathematical operation upon the random number data to create therefrom the modified data portion.

13. An electronic security key particularly adapted to exchange electronic data with an electronic coin acceptor to enable the coin acceptor for coin programming comprising an electronic security key circuit, said electronic security key circuit including port means for receiving data from a computer, means for validating the received data, and port means for transmitting the validated data to an electronic coin acceptor to thereby effect an enabled state of the electronic coin acceptor for coin programming thereof.

14. The electronic security key as defined in claim 13 wherein power for the electronic security key circuit is received through the receiving port means from a computer.

15. An electronic security key particularly adapted for exchanging electronic data with an electronic coin acceptor to enable the coin acceptor for coin programming comprising:

an electronic security key circuit for exchanging electronic data with a coin acceptor circuit, said electronic security key circuit including reception circuit means for receiving from an electronic coin acceptor information data signals involving at least one of (a) a random generated password seed data signal and (b) an electronic coin acceptor identification data signal representative of a specific electronic coin acceptor, and said electronic security key circuit further including circuit means for transmitting to an electronic coin acceptor at least one of (a) an encrypted password data signal generated at least in part from the random generated password seed data signal to enable a specific electronic coin acceptor for coin programming, (b) a person identification data signal representative of a specific authorized person, (c) an electronic security key identification data signal representative of a specific electronic security key, and (d) a date and time identification data signal representative of a specific authorized date and time.

16. The electronic security key as defined in claim 15 wherein said electronic security key circuit includes means for exchanging other electronic data with software utility of a personal computer, and the other electronic data includes at least one of:

(a) identification data representative of a specific authorized person, (b) identification data representative of an authorization date and time, and (c) identification data listing one or more identification numbers representative of specific coin acceptors which were enabled for coin programing during a first functional state.

17. The electronic security key as defined in claim 15 wherein said electronic security key circuit includes circuit means for transmitting to an electronic coin acceptor at substantially short and repeating intervals enabling state signals for maintaining the electronic coin acceptor in an enabled state for coin programming.

18. An electronic security key particularly adapted for exchanging electronic data with an electronic coin acceptor to enable the coin acceptor for coin programming comprising:

an electronic security key circuit, said electronic security key circuit including circuit means for transmitting to an electronic coin acceptor a password data signal to enable a specific electronic coin acceptor for coin programming, and said electronic security key circuit including further circuit means for transmitting to an electronic coin acceptor at substantially short and repeating intervals enabling state signals for maintaining the electronic coin acceptor in an enabled state for coin programming.

19. The electronic security key as defined in claim 18 wherein said electronic security key circuit includes circuit means for exchanging other electronic data with software utility of a personal computer, and the other electronic data includes at least one of:

(a) identification data representative of a specific authorized person, (b) identification data representative of an authorization date and time, and (c) identification data listing one or more identification numbers representative of specific coin acceptors which were enabled for coin programming during a first functional state.

20. The electronic security key as defined in claim 18 wherein said electronic security key circuit includes means for exchanging other electronic data with software utility of a personal computer, and the other electronic data includes at least one of:

(a) identification data representative of a specific electronic security key, (b) identification data representative of an authorization date and time, (c) identification data representative of a specific authorized person, and (d) identification data representative of a specific electronic coin acceptor.

21. The electronic security key as defined in claim 18, wherein said electronic security key circuit includes circuit means for transmitting to an electronic coin acceptor at substantially short and repeating intervals enabling state signals for maintaining the electronic coin acceptor in an enabled state for coin programming.

22. The electronic security key as defined in claim 18 wherein:

said electronic security key circuit includes reception circuit means for receiving from an electronic coin acceptor identification data signals representative of the specific electronic coin acceptor, and said electronic security key circuit further includes memory means for storing identification data representative of a multiplicity of specific electronic coin acceptors to permit subsequent identification of at least some electronic coin acceptors to which the electronic security key circuit was connected.

23. The electronic security key as defined in claim 22 including further circuit means for transmitting electronic data signals from the electronic security key circuit to a software utility circuit of a personal computer including (a) identification data signals representative of a specific authorized person and (b) coin acceptor identification data signals representative of at least some coin acceptors to which the electronic security key was connected.

24. An electronic security key particularly adapted for exchanging electronic data with an electronic coin acceptor to enable the coin acceptor for coin programming comprising:

an electronic security key circuit for exchanging electronic data with a coin acceptor circuit, said electronic security key circuit including circuit means for receiving identification data signals representative of a specific person authorized to enable a coin acceptor for coin programming, and said electronic security key circuit including further circuit means (a) responsive to received identification data signals for transmitting authorized identification data signals to the electronic coin acceptor to enable the electronic coin acceptor for coin programming, and (b) responsive to at least one of (b') received unauthorized identification data signals and (b") absence of authorized identification data signals for preventing the transmission of signals to the electronic coin acceptor to prevent enabling the electronic coin acceptor for coin programing.

25. An electronic security key particularly adapted for exchanging electronic data with an electronic coin acceptor to enable the coin acceptor for coin programming comprising:

an electronic security key circuit, said electronic security key circuit including reception circuit means for receiving from an electronic coin acceptor identification data signals representative of the specific electronic coin acceptor, and said electronic security key circuit further including memory means for storing identification data representative of a multiplicity of specific electronic coin acceptor to permit subsequent identification of at least some electronic coin acceptors to which the electronic security key circuit was connected.

26. An electronic security key particularly adapted for exchanging electronic data with an electronic coin acceptor to enable the coin acceptor for coin programming comprising:

an electronic security key circuit, and said electronic security key circuit further including circuit means for receiving other electronic data signals from a software utility of a personal computer including identification data signals representative of a specific authorized person whose authorization had earlier been validated by a security circuit system of the software utility.

27. A method of enabling an electronic coin acceptor for coin programming utilizing an electronic security key comprising the steps of:

providing an electronic coin acceptor with an electronic coin acceptor circuit including a communication circuit, providing an electronic security key with an electronic security key circuit including a communication circuit, effecting transmission and reception to and between the electronic coin acceptor and the electronic security key communication circuits, transmitting data signals including a substantially random number from the coin acceptor circuit to the electronic security key circuit, utilizing an encryption algorithm of the electronic security key on data inclusive of the substantially random number to create a password data signal, transmitting the created password data signal from the electronic security key circuit to the electronic coin acceptor circuit, and validating the received password data signal by the electronic coin acceptor circuit to thereby enable coin programming only if the password data signal is acceptable.

28. The electronic coin acceptor enabling method as defined in claim 27 including further steps of:

transmitting a connection code signal from the electronic security key circuit to the electronic coin acceptor circuit on substantially short and repeating intervals to confirm connection between the communication circuits, and automatically disabling coin programming by the electronic coin acceptor circuit if a connection code signal is not received within a predetermined time interval longer than the repeating intervals.

29. A method of enabling an electronic coin acceptor for coin programming with an electronic security key comprising the steps of:

providing an electronic coin acceptor with an electronic coin acceptor circuit including a communication circuit, providing an electronic security key with an electronic security key circuit including a communication circuit, establishing data transmission to and between the electronic coin acceptor and the electronic security key communication circuits to enable an exchange of electronic data signals, transmitting password data signals from the electronic security key circuit to the electronic coin acceptor circuit, validating a received password data signal by the electronic coin acceptor circuit and enabling coin programming only if the password data signal is satisfactory, transmitting from the electronic security key circuit to the electronic coin acceptor circuit for storage therein at least one of (a) identification data signals representative of the specific electronic security key, (b) identification data signals representative of a specific authorized person, and (c) identification data signals representative of an authorization date and time, and transmitting identification data representative of a specific coin acceptor to a specific security key for storage therein.

30. The electronic coin acceptor enabling method as defined in claim 29 including the steps of:

establishing transmission between the electronic security key circuit and a circuit of a personal computer, running a software utility program on the personal computer circuit for validating personnel desiring authorization to enable and communicate with the electronic security key circuit, transmitting validated identification data signals representative of a specific authorized person to the electronic security key circuit for storage therein and effecting a logged-on state, and enabling the electronic security key circuit to generate valid password data signals only if the validated identification data signals are currently in a logged-on state in the electronic security key circuit.

31. The method of enabling an electronic coin acceptor as defined in claim 29 including the steps of:

effecting transmission between the electronic security key circuit and a personal computer circuit of a personal computer, running a software utility program on the personal computer software for downloading data from the electronic security key circuit and effecting a logged-off state, transmitting identification data signals representative of a specific authorized person and an identification data signal representative of each coin acceptor to which the electronic security key was recently connected, and transmitting a disabled code signal from the personal computer circuit to the electronic security key circuit to effect a logged-off state of the latter and disable the electronic security key from generating valid password data.

* * * * *